(12) United States Patent
El-Hibri et al.

(10) Patent No.: US 10,233,299 B2
(45) Date of Patent: Mar. 19, 2019

(54) POLYARYLENE FOAM MATERIALS

(71) Applicant: SOLVAY SPECIALTY POLYMERS USA, LLC, Alpharetta, GA (US)

(72) Inventors: Mohammad Jamal El-Hibri, Atlanta, GA (US); Marc Schelles, Geel (BE); Michel Magdelyns, Dongelberg (BE)

(73) Assignee: Solvay Speciality Polymers USA, LLC, Alpharetta, GA (US)

( * ) Notice: Subject to any disclaimer, the term of this patent is extended or adjusted under 35 U.S.C. 154(b) by 0 days.

(21) Appl. No.: 14/649,730

(22) PCT Filed: Dec. 3, 2013

(86) PCT No.: PCT/EP2013/075315
§ 371 (c)(1),
(2) Date: Jun. 4, 2015

(87) PCT Pub. No.: WO2014/086744
PCT Pub. Date: Jun. 12, 2014

(65) Prior Publication Data
US 2015/0307677 A1    Oct. 29, 2015

Related U.S. Application Data

(60) Provisional application No. 61/734,019, filed on Dec. 6, 2012.

(30) Foreign Application Priority Data

Feb. 12, 2013  (EP) .................................. 13154975

(51) Int. Cl.
*C08J 9/00* (2006.01)
*C08J 9/14* (2006.01)
(Continued)

(52) U.S. Cl.
CPC ........... *C08J 9/0061* (2013.01); *B32B 27/065* (2013.01); *B32B 27/286* (2013.01); *B32B 27/325* (2013.01); *C08J 9/0066* (2013.01); *C08J 9/142* (2013.01); *B32B 2250/03* (2013.01); *B32B 2250/24* (2013.01); *B32B 2250/40* (2013.01); *B32B 2266/025* (2013.01); *B32B 2266/0214* (2013.01); *B32B 2305/022* (2013.01); *B32B 2307/102* (2013.01); *B32B 2307/304* (2013.01); *B32B 2307/306* (2013.01); *B32B 2307/3065* (2013.01); *B32B 2307/558* (2013.01);
(Continued)

(58) Field of Classification Search
CPC ......................... C08J 2365/02; C08J 2381/06
See application file for complete search history.

(56) References Cited

U.S. PATENT DOCUMENTS 3,573,144 A * 3/1971 Andersen ............... B29C 70/345
156/148
5,017,622 A * 5/1991 Bland .................... C08J 9/0061
521/134
(Continued)

FOREIGN PATENT DOCUMENTS

WO    2006094988 A2    9/2006

OTHER PUBLICATIONS

Baldwin D. et al., "A microcellular processing study of pol(ethylene terephthalate) in the amorphous and semicrystalline states. Part I : microcell nucleation", in Polymer Engineering and Science, 1996, vol. 11, No. 11, p. 1437-1445.
Paul D.R. et al., in Polymer Blends, 1978, vol. 1, Chapter 5, p. 188-189, Academic Press, New York.
Hsieh M.-C. et al., "Preparation and characterization of PPSU/PEI blend membranes", Chemistry and Chemical Engineering (ICCCE), 2010 International Conference, Aug. 1-3, 2010, p. 60-62.
Sun H. et al., "Molecular composites by incorporation of a rod-like polymer into a functionalized high-performance polymer, and their conversion into microcellular foams", Colloid and Polymer Science, Mar. 2004, vol. 282, Issue 5, pp. 502-510.

*Primary Examiner* — Michael M Dollinger
*Assistant Examiner* — Christina H Wales
(74) *Attorney, Agent, or Firm* — Jarrod N. Raphael; Helene Laville

(57) ABSTRACT

A foam material having one glass transition temperature (Tg) and made from an immiscible composition having at least two glass transition temperatures (Tg) by an extrusion process wherein said composition (C) comprises at least one polyarylene (P1) polymer, wherein more than 50% by moles (moles %) of the recurring units of said (P1) polymer are recurring units (R1) consisting of an arylene group, wherein said arylene group is a hydrocarbon divalent group consisting of one core composed of one benzene ring or of a plurality of benzene rings fused together by sharing two or more neighboring ring carbon atoms, said benzene ring being optionally substituted, wherein each of said arylene group is bound to two other arylene groups of neighboring recurring units (R1) through a first C—C bond (E1) and a second C—C bond (E2), wherein at least 20 moles % of recurring units (R1) are kink-forming arylene units (R1-b), the remainder being rigid rod-forming arylene units (R1-a) different from arylene$_{R1\_b}$ units, wherein in said arylene$R_{1\_a}$ units the bond (E1) and the bond (E2) are co-linear and anti-parallel towards each other, said (P1) polymer being present in composition (C) in an amount of below 75% by weight (wt. %) and above 10 wt. % based on the total wt. % of (P1) polymer and (PPSU) polymer, and (ii) at least one polyphenylsulfone polymer, said (PPSU) polymer being present in composition (C) in an amount of below 90 wt. % and above 25 wt. % of based on the total wt. % of polyarylene (P4) polymer and (PPSU) polymer.

16 Claims, No Drawings

(51) Int. Cl.
*B32B 27/06* (2006.01)
*B32B 27/28* (2006.01)
*B32B 27/32* (2006.01)

(52) U.S. Cl.
CPC ..... *B32B 2307/56* (2013.01); *B32B 2307/714* (2013.01); *B32B 2605/18* (2013.01); *B32B 2607/00* (2013.01); *C08J 2201/03* (2013.01); *C08J 2203/12* (2013.01); *C08J 2205/044* (2013.01); *C08J 2205/046* (2013.01); *C08J 2365/02* (2013.01); *C08J 2381/06* (2013.01); *C08J 2465/02* (2013.01); *C08J 2481/06* (2013.01)

(56) References Cited

U.S. PATENT DOCUMENTS

| | | | |
|---|---|---|---|
| 5,231,150 A | 7/1993 | McGrail et al. | |
| 2004/0020853 A1 | 2/2004 | Krause et al. | |
| 2006/0138044 A1 | 6/2006 | Krause et al. | |
| 2007/0066740 A1 | 3/2007 | Odle et al. | |
| 2008/0293840 A1* | 11/2008 | Maljkovic | C08L 65/02 521/134 |
| 2010/0273957 A1 | 10/2010 | Srinivasan et al. | |
| 2010/0324171 A1* | 12/2010 | Maljkovic | C08G 65/4012 523/219 |

* cited by examiner

POLYARYLENE FOAM MATERIALS

This application claims priority to U.S. provisional application No. 61/734,019 filed on 6 Dec. 2012 and to European application No. 13154975.0 filed on 12 Feb. 2013, the whole content of each of these applications being incorporated herein by reference for all purposes.

FIELD OF INVENTION

The present invention relates to polymeric foams, in particular, to polyarylene/polyphenylsulfone (PPSU) foam materials. The invention further relates to methods of manufacturing said foam materials and articles made therefrom.

BACKGROUND OF THE INVENTION

It is known that there is growing need to use high strength polymeric foams in lightweight applications a such as transport, in particular aerospace, mobile electronics, building materials, household goods, food service trays and medical, and the like. The use of said high strength polymeric foams, especially in light structures, such as for example in structural sandwich panels implies critical properties such as notably very high mechanical strength combined with excellent lightweight but also thermal resistance, flame resistance, environmental resistance, low-temperature impact resistance, thermal-insulating characteristics, soundproofing characteristics, vibration-proofing characteristics, chemical resistance, and recycling properties.

Polymeric foams made from a blend of polyarylene, in particular a rigid-rod polyphenylene with a poly(aryl ether sulfone) resin, in particular polyphenylsulfone has been described in WO 2006/094988 as an interesting polymeric foam having low density and high strength properties. It has been shown in WO 2006/094988 that blending small amounts of said rigid-rod polyphenylene polymers into a poly(aryl ether sulfone), in particular PPSU resin allowed the manufacturing of foams having a lower overall bulk foam densities while maintaining the mechanical properties of the rigid-rod polyphenylene polymer. Said foams were prepared by using a supercritical foaming process as described by Baldwin, D., in Polymer Engineering and Science, Vol. 36, No. 11, pp. 1437-1445, 1996 which is known as a batch foaming process. However, the working examples only show foams made from a specific polyphenylene 1 (i.e. rigid-rod polyphenylene copolymer, commercially available as PrimoSpire® PR-120 Self-Reinforced Polyphenylene, formerly marketed as PARMAX® 1200)/PPSU blend wherein the concentration of polyphenylene 1 is maximal 25 wt. %, based on the total weight % of polyphenylene 1 and PPSU, and the lowest foam density was achieved only at the very low polyphenylene 1 concentration of 6 wt. %.

One of the main issues in blending polyarylene polymers with aromatic poly(arylethersulfone) polymers, is the limited miscibility between the two polymers. Especially, the rigid-rod polyphenylene copolymer/PPSU polymer blends are suffering from this limited miscibility.

It is generally known that immiscible blends exhibit difficulties in foaming processes as notably used in the polymer foams industry. For example, nucleating agents as generally used in foaming processes can have a tendency to aggregate in one of the two distinct phases thereby causing notably weakening to foam cell walls. Another disadvantage is for instance that the immiscibility of the blend prevents uniform solubility of the blowing agent in the blend.

Thus, there is still a high need for foam materials comprising PPSU blends enriched with polyarylene polymers which can overcome all these drawbacks, as mentioned above, and whereby said foam material are characterized by having superior mechanical properties such as high stiffness and strength properties at a low foam density, improved thermal performance capabilities, in particular more robust resistance to very high temperatures used in the manufacturing of structural foamed articles and having improved chemical resistance while retaining all excellent foam properties such as a well defined, fine and fairly homogeneous cell structure, and whereby the high-strength foam articles made there from have excellent heat resistance, flame resistance, and environmental resistance, mechanical strength, and low-temperature impact resistance, and possesses excellent lightweight, thermal-insulating characteristics, soundproofing characteristics, vibration-proofing characteristics, chemical resistance, and recycling properties.

SUMMARY OF INVENTION

The Applicant has now found surprisingly that certain polyarylene/polyphenylsulfone (PPSU) foam materials and comprising optionally specific ingredients are particularly effective in fulfilling above mentioned requirements. Said foam materials have unexpectedly a well defined, fine, and homogeneous cell structure as evidenced by closed and smaller foam cells, higher foam void contents, and/or greater uniformity of cell size. Moreover, said foam materials have superior mechanical properties such as high stiffness and strength properties at a low foam density required for the manufacturing of the high-strength foam articles. Said foam articles fulfil all requirements as mentioned above.

The invention thus pertains to a foam material having one glass transition temperature (Tg), as measured by differential scanning calorimetry (DSC) and made from an immiscible composition having at least two glass transition temperatures (Tg) [composition (C), herein after] by an extrusion foaming process wherein said composition (C) comprises:

(i) at least one polyarylene (P1) polymer, wherein more than 50% by moles (moles %) of the recurring units of said (P1) polymer are recurring units (R1) consisting of an arylene group, wherein said arylene group is a hydrocarbon divalent group consisting of one core [core (C), herein after] composed of one benzene ring or of a plurality of benzene rings fused together by sharing two or more neighboring ring carbon atoms, said benzene ring being optionally substituted, wherein each of said arylene group is bound to two other arylene groups of neighboring recurring units (R1) through a first C—C bond (E1) and a second C—C bond (E2), wherein at least 20 moles % of recurring units (R1) are kink-forming arylene units (R1-b) [arylene$_{R1-b}$ units hereafter,], the remainder being rigid rod-forming arylene units (R1-a) [arylene$_{R1-a}$ units hereafter] different from arylene$_{R1-b}$ units, wherein in said arylene$_{R1-a}$ units the bond (E1) and the bond (E2) are co-linear and anti-parallel towards each other, said (P1) polymer being present in composition (C) in an amount of below 75% by weight (wt. %) and above 10 wt. % based on the total wt. % of (P1) polymer and (PPSU) polymer, and (ii) at least one polyphenylsulfone polymer [(PPSU) polymer, herein after], wherein more than 50% by moles of the recurring units of said (PPSU) polymer are recurring units ($R_{PPSU}$) of formula (A), herein below:

(A)

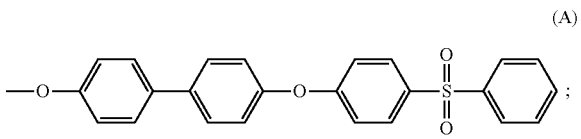 [SMILES: COc1ccc(-c2ccc(Oc3ccc(S(=O)(=O)c4ccccc4)cc3)cc2)cc1]

said (PPSU) polymer being present in composition (C) in an amount of below 90 wt. % and above 25 wt. % of based on the total wt. % of polyarylene (P1) polymer and (PPSU) polymer.

Another aspect of the present invention is directed to a process for the manufacturing of the foam material.

Yet another aspect of the present invention is directed to an article that includes said foam material.

DETAILED DESCRIPTION OF EMBODIMENTS

Polyarylene (P1) Polymer

The core (C) of the arylene group of the recurring units (R1) is composed of preferably at most 3, more preferably at most 2, and still more preferably at most one benzene ring.

For the purpose of the present invention, the bond (E1) and the bond (E2) are "co-linear" when a vector (e1) representing the bond (E1) and extending from the core (C) to the first neighboring recurring unit in a three dimensional space around the core (C), is positioned in substantially the same straight line as vector (e2) representing the bond (E2) and extending from the core (C) to the second neighboring recurring unit.

For the purpose of the present invention, the bond (E1) and the bond (E2) are "anti-parallel" when the vector (e1), as above defined, is pointed in the opposite direction than the vector (e2), as above defined.

The two bonds (E1) and (E2) in the arylene$_{R1-a}$ units, as mentioned above, can notably be sketched as in Structure 1, shown herein below:

Structure 1

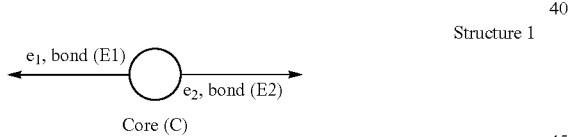

wherein in Structure 1, the core (C), as mentioned above, is visualized by a circle and the bond (E1) and the bond (E2), are visualized by vector ($e_1$) and vector ($e_2$), respectively.

The arylene group of which the recurring units (R1) consists can be unsubstituted. Alternatively, it can be substituted by at least one monovalent substituting group.

The monovalent substituting group is usually not polymeric in nature; its molecular weight is preferably below 500, more preferably below 300, still more preferably below 200 and the most preferably below 150.

The monovalent substituting group is advantageously a solubilizing group. A solubilizing group is one increasing the solubility of the polyarylene (P1) polymer in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene (P1) polymer by a solution polymerization process.

The monovalent substituting group is also advantageously a group which increases the fusibility of the polyarylene (P1) polymer, i.e. it lowers its glass transition temperature and its melt viscosity, so as to desirably make the polyarylene (P1) polymer suitable for thermoprocessing.

Preferably, the monovalent substituting group is chosen from:
hydrocarbyls such as alkyls, aryls, alkylaryls and aralkyls;
halogenes such as —Cl, —Br, —F and —I;
hydrocarbyl groups partially or completely substituted by at least one halogen atom such as halogenoalkyls, halogenoaryls, halogenoalkylaryls and halogenoaralkyls;
hydroxyl;
hydrocarbyl groups substituted by at least one hydroxyl group, such as hydroxyalkyls, hydroxyaryls, hydroxyalkylaryls and hydroxyaralkyls;
hydrocarbyloxys [—O—R, where R is a hydrocarbyl group], such as alkoxys, aryloxys, alkylaryloxys and aralkyloxys;
amino (—NH$_2$);
hydrocarbyl groups substituted by at least one amino group, such as aminoalkyls and aminoaryls;
hydrocarbylamines [—NHR or —NR$_2$, where R is a hydrocarbyl group] such as alkylamines and arylamines;
carboxylic acids and their metal or ammonium salts, carboxylic acid halides, carboxylic anhydrides;
hydrocarbyl groups substituted by at least one of carboxylic acids, metals or ammonium salts thereof, carboxylic acid halides and carboxylic anhydrides, such as —R—C(=O)OH where R is an alkyl or an aryl group;
hydrocarbylesters [—C(=O)OR or —O—C(=O)R, where R is a hydrocarbyl group] such as alkylesters, arylesters, alkylarylesters and aralkylesters;
amido [—C(=O)NH$_2$];
hydrocarbyl groups substituted by at least one amido group;
hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
sulfinic acid (—SO$_2$H), sulfonic acid (—SO$_3$H), their metal or ammonium salts,
hydrocarbylsulfones [—S(=O)$_2$—R, where R is the hydrocarbyl group], such as alkylsulfones, arylsulfones, alkylarylsulfones, aralkylsulfones;
aldehyde [—C(=O)H] and halo formyls [—C(=O)X, wherein X is a halogen atom];
hydrocarbylketones [—C(=O)—R, where R is a hydrocarbyl group], such as alkylketones, arylketones, alkylarylketones and aralkylketones;
hydrocarbyloxyhydrocarbylketones [—C(=O)—R$^1$—O—R$^2$, where R$^1$ is a divalent hydrocarbon group such as an alkylene, an arylene, an alkylarylene or an aralkylene, preferably a C$_1$-C$_{18}$ alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;
any of the above groups comprising at least one hydrocarbyl group or a divalent hydrocarbon group R$^1$, wherein said hydrocarbyl group or said $R^1$ is itself substituted by at least one of the above listed monovalent substituting groups, e.g. an arylketone —C(=O)—R, where R is an aryl group substituted by one hydroxyl group;

where:

the hydrocarbyl groups contain preferably from 1 and 30 carbon atoms, more preferably from 1 to 12 carbon atoms and still more preferably from 1 to 6 carbon atoms;

the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;

the aryl groups are defined as monovalent groups consisting of one end and one core composed of one benzene ring (such the phenyl group) or of a plurality of benzene rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;

the aryl groups contain preferably from 6 to 30 carbon atoms; more preferably, they are phenyl groups;

the alkyl group which is contained in the alkylaryl groups meets the preferences of the alkyl groups as above expressed;

the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [—C(=O)-phenyl].

Non limitative examples of an arylene group contained in said arylene$_{R1-a}$ units [arylene$_{R1-a}$ groups, herein after] include:

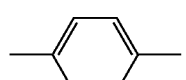

1,4-phenylene
(also named
p-phenylene)

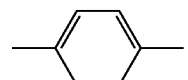

1,4-naphthylene

-continued

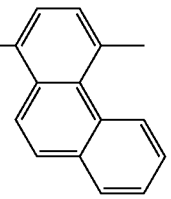 and 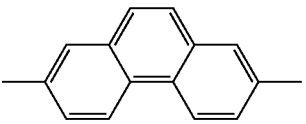

1,4-phenanthrylene and
2,7-phenanthrylene

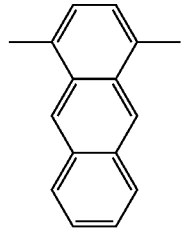 and 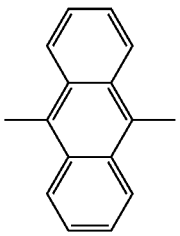

1,4-anthrylene and
9,10-anthrylene

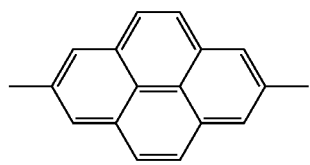

2,7-pyrenylene

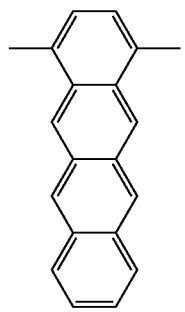 and 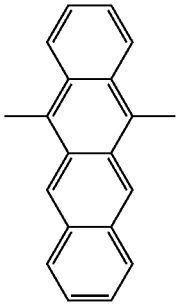

1,4-naphthacenylene and
5,12-naphthacenylene

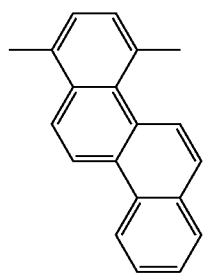

1,4-chrysenylene

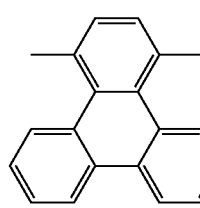 and

-continued

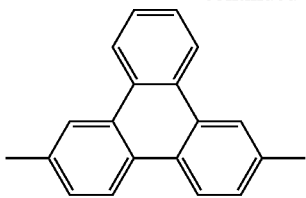

1,4-triphenylylene and
2,7-triphenylylene

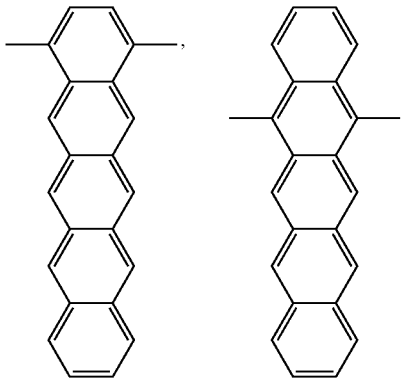

1,4-pentacenylene,
5,14-pentacenylene and
6,13-pentacenylene

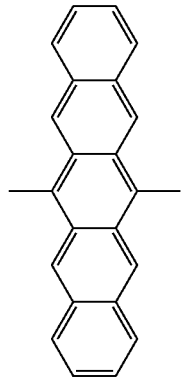

1,6-coronenylene

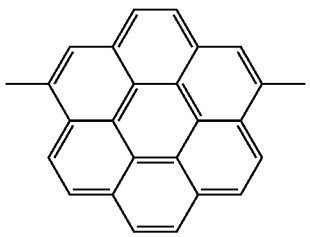

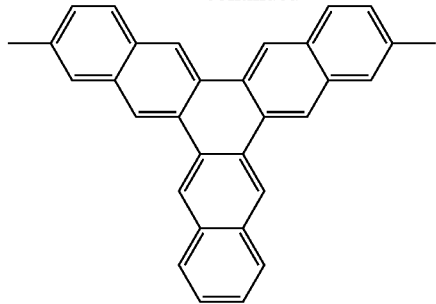

and

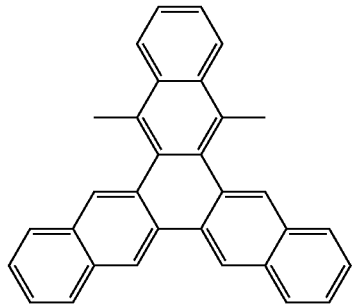

1,4-trinaphthylenylene,
2,9-trinaphthylenylene and
5,18-trinaphthylenylene and any of these groups substituted by at least one monovalent substituting group, as above defined, in particular by a phenylketone group.

Preferred arylene$_{R1-a}$ units are p-phenylenes substituted by at least one monovalent substituting group.

More preferred arylene$_{R1-a}$ units are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed.

Even more preferred arylene$_{R1-a}$ units are p-phenylenes substituted by at least one monovalent substituting group chosen from arylketones and aryloxyarylketones, said arylketones and aryloxyarylketones being unsubstituted or substituted by at least one monovalent substituting group as those above listed.

Most preferred arylene$_{R1-a}$ units are p-phenylenes substituted by an arylketone group, in particular by the phenylketone group.

Preferred arylene$_{R1-b}$ units are chosen from a group selected from recurring units (R1-b1) [arylene$_{R1-b1}$ units, herein after], recurring units (R1-b2) [arylene$_{R1-b2}$ units, herein after], recurring units (R1-b3) [arylene$_{R1-b3}$ units, herein after] and recurring units (R1-b4) [arylene$_{R1-b4}$ units, herein after], as defined below.

In one preferred embodiment of the present invention, the arylene$_{R1-b}$ units are recurring units (R1-b1) [arylene$_{R1-b1}$ units, herein after] wherein in said arylene$_{R1-b1}$ units, the vector (e1) corresponding to bond (E1) and extending from the core (C) to the first neighboring recurring unit is forming in the three dimensional space around the core (C) an angle α with the vector (e2) corresponding to the bond (E2) and extending from the core (C) to the second recurring unit, wherein said angle α is above 0° and less than 90°.

The two bonds (E1) and (E2) in the arylene$_{R1-b1}$ units, as mentioned above, can notably be sketched as in Structure 2, shown herein below:

Structure 2

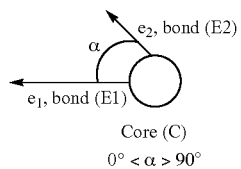

Core (C)
0° < α > 90° wherein in Structure 2, the core (C), as mentioned above, is visualized by a circle and the bond (E1) and the bond (E2), are visualized by vector ($e_1$) and vector ($e_2$), respectively, and wherein angle α is above 0° and less than 90°.

Non limitative examples of an arylene group contained in said arylene$_{R1-b1}$ units [arylene$_{R1-b1}$ groups, herein after] include:

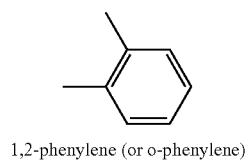

1,2-phenylene (or o-phenylene)

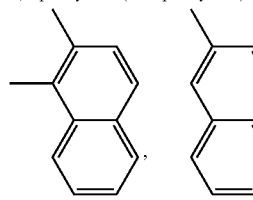

1,2- 2,3- and 1,7-naphtylenes

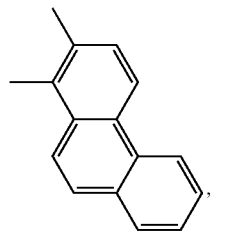

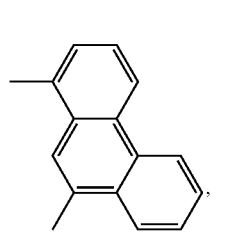

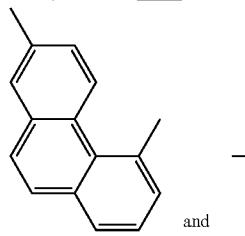

1,2-, 1,8-, 1,9-, 2,3-, 2,5- and 2,10- phenanthrylenes

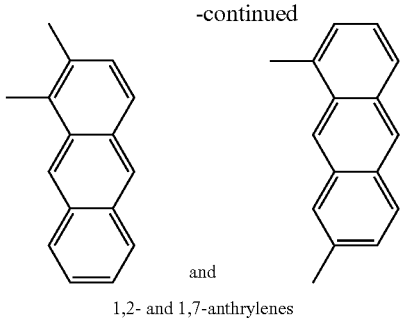

and 1,2- and 1,7-anthrylenes and any of these groups substituted by at least one monovalent substituting group, as above defined, in particular by a phenylketone group.

In another embodiment of the present invention, the arylene$_{R1-b}$ units are recurring units (R1-b2) [arylene$_{R1-b2}$ units, herein after] wherein in said arylene$_{R1-b2}$ units, the vector (e1) corresponding to bond (E1) and extending from the core (C) to the first neighboring recurring unit is forming in the three dimensional space around the core (C) an angle β with the vector (e2) corresponding to the bond (E2) and extending from the core (C) to the second neighboring recurring unit, wherein said angle β is equal to or above 90° and less than 180°.

The two bonds (E1) and (E2) in the arylene$_{R1-b2}$ units, as mentioned above, can notably be sketched as in Structure 3, shown herein below:

Structure 3

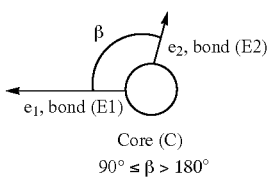

Core (C)
90° ≤ β > 180° wherein in Structure 3, the core (C), as mentioned above, is visualized by a circle and the bond (E1) and the bond (E2), are visualized by vector ($e_1$) and vector ($e_2$), respectively, and wherein the angle β is equal to or above 90° and less than 180°.

Non limitative examples of an arylene group contained in such arylene$_{R1-b2}$ units [arylene$_{R1-b2}$ groups, herein after] include:

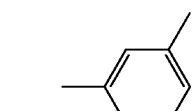

1,3-phenylene (or m-phenylene)

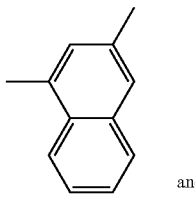

1,3- and 1,6-naphtylenes

-continued

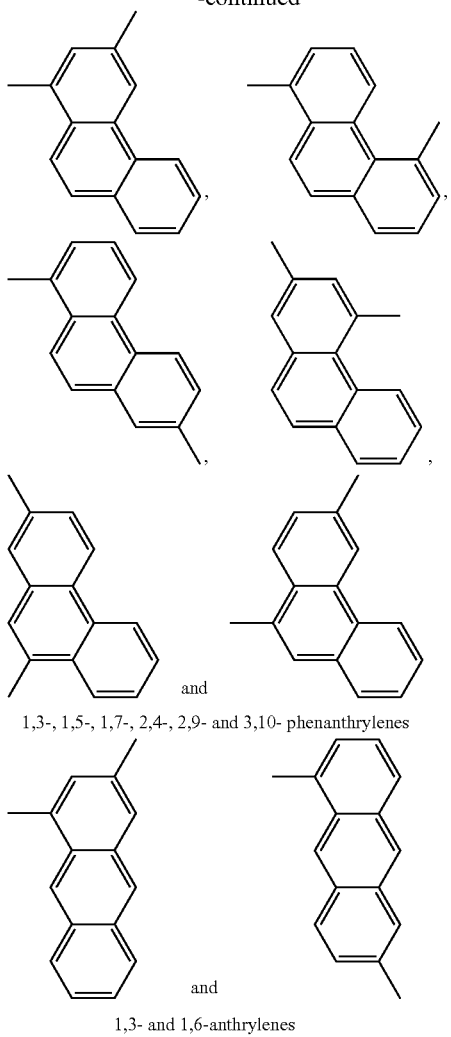

1,3-, 1,5-, 1,7-, 2,4-, 2,9- and 3,10- phenanthrylenes 1,3- and 1,6-anthrylenes and any of these groups substituted by at least one monovalent substituting group, as above defined, in particular by a phenylketone group.

In another embodiment of the present invention, the arylene$_{R1-b}$ units are recurring units (R1-b3) [arylene$_{R1-b3}$ units, herein after] wherein in said arylene$_{R1-b3}$ units, the vector (e1) corresponding to bond (E1) and extending from the core (C) to the first neighboring recurring unit is in the three dimensional space around the core (C) co-parallel to the vector (e2) corresponding to the bond (E2) and extending from the core (C) to the second neighboring recurring unit in the same direction on parallel lines, but not co-linear, i.e. not on same straight line.

The two bonds (E1) and (E2) in the arylene$_{R1-b3}$ units, as mentioned above, can notably be sketched as in Structure 4, shown herein below:

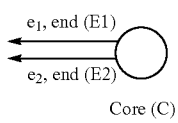

Structure 4

Core (C)

wherein in Structure 4, the core (C), as mentioned above, is visualized by a circle and the bond (E1) and the bond (E2), are visualized by vector (e$_1$) and vector (e$_2$) respectively. The vector (e2) is not co-linear; i.e. no in a straight line with the vector (e1) with the vector (e1) but is parallel to the vector (e1) and pointing in the same direction than the vector (e1).

Non limitative examples of an arylene group contained in said arylene$_{R1-b3}$ units [arylene$_{R1-b3}$ groups, herein after] include:

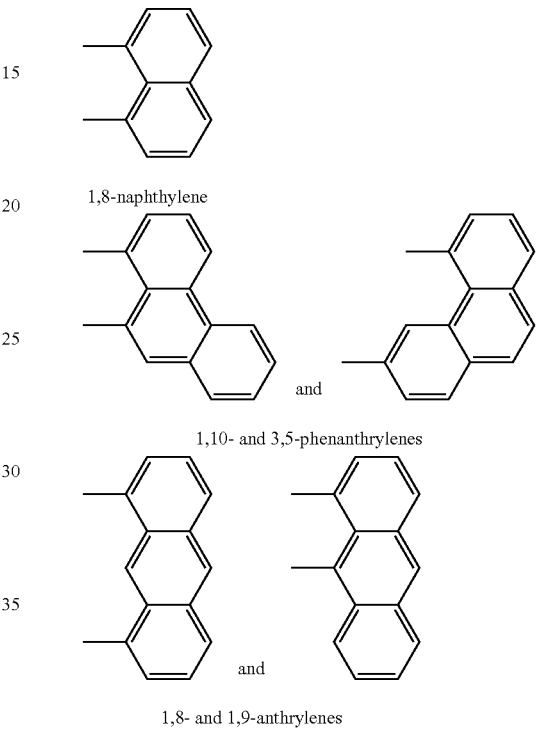

1,8-naphthylene 1,10- and 3,5-phenanthrylenes 1,8- and 1,9-anthrylenes and any of these groups substituted by at least one monovalent substituting group, as above defined, in particular by a phenylketone group.

Yet in another embodiment of the present invention, the arylene$_{R1-b}$ units are recurring units (R1-b4) [arylene$_{R1-b4}$ units, herein after] wherein in said arylene$_{R1-b4}$ units, the vector (e1) corresponding to bond (E1) and extending from the core (C) to the first neighboring recurring unit is in the three dimensional space around the core (C) anti-parallel to the vector (e2) corresponding to the bond (E2) and extending from the core (C) to the second neighboring recurring unit in opposite same direction on parallel lines, but not co-linear, i.e. not on same straight line.

The two bonds (E1) and (E2) in the arylene$_{R1-b4}$ units, as mentioned above, can notably be sketched as in Structure 5, shown herein below:

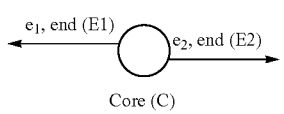

Structure 5

Core (C)

wherein in Structure 5, the core (C), as mentioned above, is visualized by a circle and the bond (E1) and the bond (E2), are visualized by a vector ($e_1$) and a vector ($e_2$) respectively. The vector ($e_2$) is not co-linear; i.e. no in a straight line with the vector ($e_1$) but is anti-parallel to the vector ($e_1$) thus pointing in the opposite direction than the vector ($e_1$).

Non limitative examples of an arylene group contained in said arylene$_{R1-b4}$ units [arylene$_{R1-b4}$ groups, herein after] include:

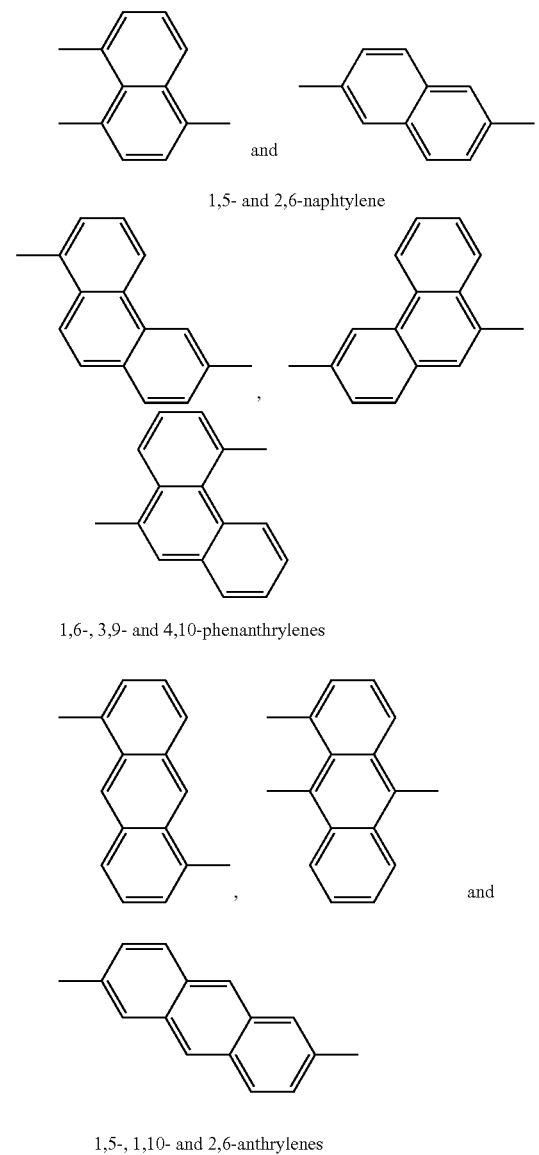

1,5- and 2,6-naphtylene 1,6-, 3,9- and 4,10-phenanthrylenes 1,5-, 1,10- and 2,6-anthrylenes and any of these groups substituted by at least one monovalent substituting group, as above defined, in particular by a phenylketone group.

In yet another embodiment, the arylene$_{R1-b}$ units, as described above, are chosen from a group selected from arylene$_{R1-b1}$ units, as described above, arylene$_{R1-b2}$ units, as described above and arylene$_{R1-b4}$ units, as described above.

Preferred arylene$_{R1-b1}$ units are m-phenylenes optionally substituted by at least one monovalent substituting group, as described above.

Most preferred arylene$_{R1-b1}$ units are m-phenylenes.

The mole amount of the arylene$_{R1-b}$ units in the polyarylene (P1) polymer is preferably at least 25%, more preferably at least 30%, still more preferably at least 35%, still more preferably at least 40%, and most preferably at least 45%, based on the total amount of moles of the recurring units (R1) comprised in the polyarylene (P1) polymer. It is further understood that the mole amount of the arylene$_{R1-b}$ units in the polyarylene (P1) polymer is preferably of at most 90%, more preferably at most 75%, still more preferably at most 65% and most preferably at most 55%.

Good results were obtained when the mole amount of arylene$_{R1-b}$ units in the polyarylene (P1) is in an amount from 45-55%, based on the total amount of moles of the recurring units (R1) comprised in the polyarylene (P1) polymer.

In a particular embodiment of the present invention, the polyarylene (P1) polymer comprised in the composition (C), as described above, can comprise, in addition to recurring units (R1), as detailed above, recurring units (R1*) comprising a Ar—SO$_2$—Ar' group, with Ar and Ar', equal to or different from each other, being aromatic groups, said recurring units (R1*) generally complying with formulae (S1):

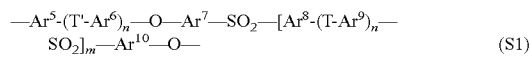

(S1)

wherein:

Ar$^5$, Ar$^6$, Ar$^7$, Ar$^8$, and Ar$^8$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

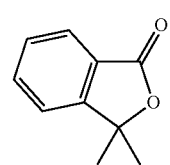

preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

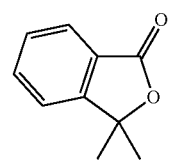

n and m, equal to or different from each other, are independently zero or an integer of 1 to 5;

Recurring units (R1*) can be notably selected from the group consisting of those of formulae (S1-A) to (S1-D) herein below:

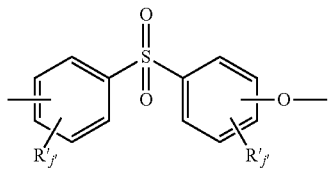 (S1-A)

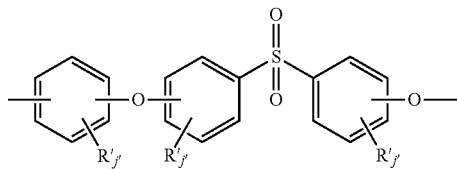 (S1-B)

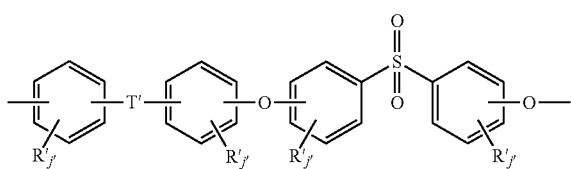 (S1-C)

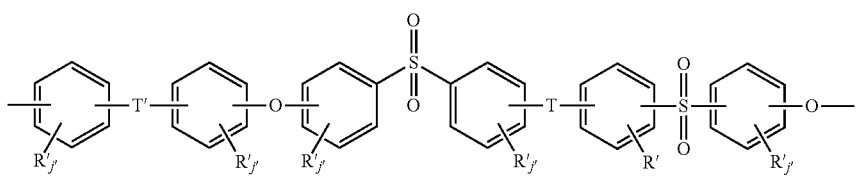 (S1-D)

wherein:

each of $R^1$, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T' is selected from the group consisting of a bond, —$CH_2$—, —C(O)—, —C($CH_3$)$_2$—, —C($CF_3$)$_2$—, —C(=$CCl_2$)—, —C($CH_3$)($CH_2CH_2COOH$)—, —$SO_2$—, and a group of formula:

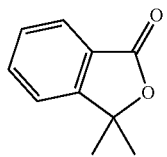

preferably T is selected from the group consisting of a bond, —$CH_2$—, —C(O)—, —C($CH_3$)$_2$—, —C($CF_3$)$_2$—, —C(=$CCl_2$)—, —C($CH_3$) ($CH_2CH_2COOH$)—, and a group of formula:

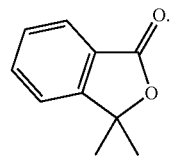

In recurring unit (R1*), the respective phenylene moieties may independently have 1,2-, 1,4- or 1,3-linkages to the other moieties different from $R^1$ in the recurring unit. Preferably, said phenylene moieties have 1,3- or 1,4-linkages, more preferably they have 1,4-linkage. Still, in recurring units ((R1*), j' is at each occurrence zero, that is to say that the phenylene moieties have no other substituents than those enabling linkage in the main chain of the polymer According to certain embodiments of the present invention, the polyarylene (P1) polymer comprised in the composition (C), as described above, can comprise, in addition to recurring units (R1), as detailed above, recurring units (R2*) comprising a Ar—C(O)—Ar' group, with Ar and Ar', equal to or different from each other, being aromatic groups, said recurring units (R2*) being generally selected from the group consisting of formulae (J-A) to (J-O), herein below:

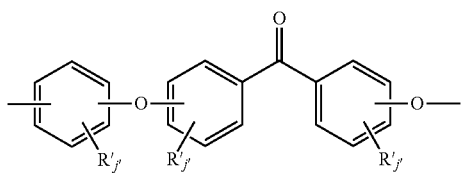 (J-A)

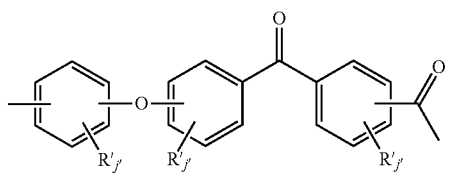 (J-B)

-continued
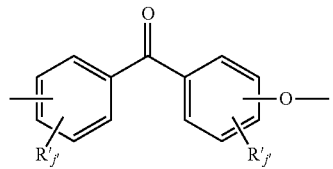
(J-C)
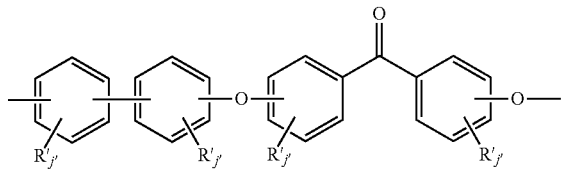
(J-D)
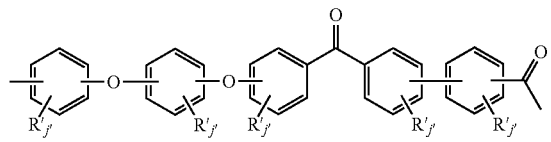
(J-E)
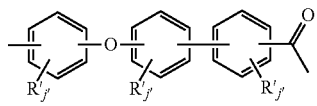
(J-F)
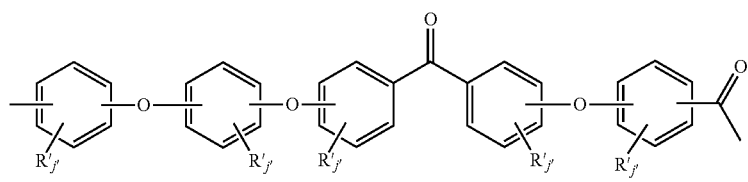
(J-G)
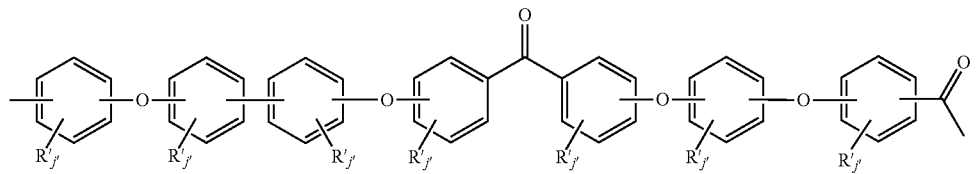
(J-H)
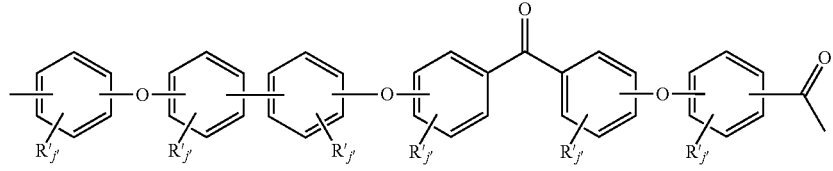
(J-I)
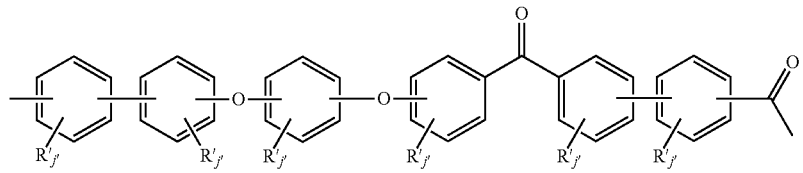
(J-J)
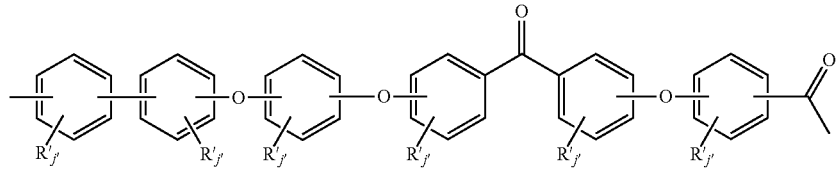
(J-K)
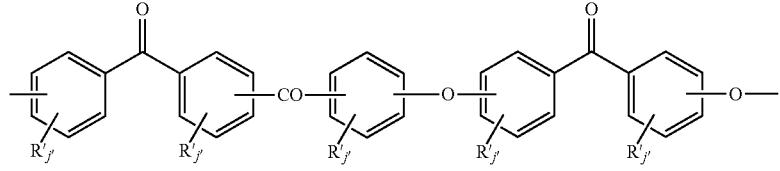
(J-L)

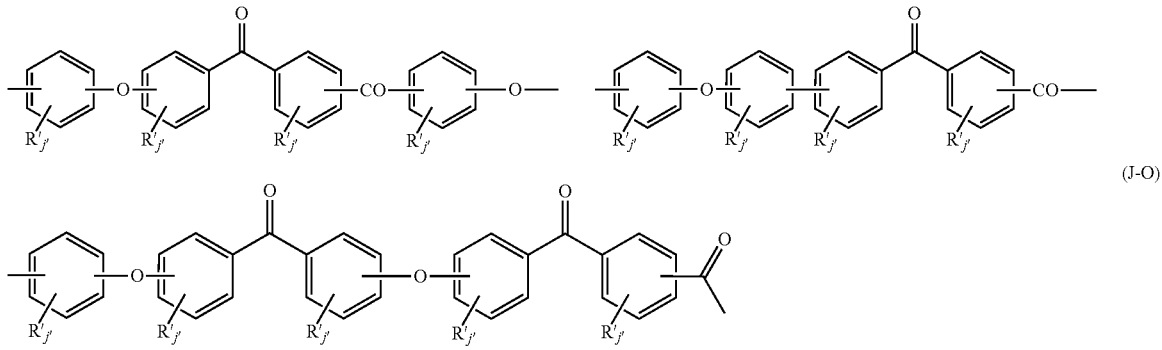

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

According to another particular embodiment of the present invention, the polyarylene (P1) polymer comprised in the composition (C), as described above, can comprise, in addition to recurring units (R1), as detailed above, recurring units (R3*) being generally selected from the group consisting of formulae (K-A) and (K-B), herein below:

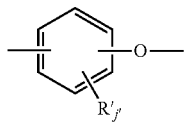
(K-A)

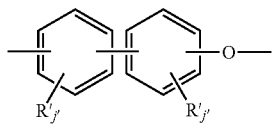
(K-B)

wherein:
each of $R^1$, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

According to certain preferred embodiments, more than 70% moles, and more preferably more than 85% moles of the recurring units of the polyarylene (P1) polymer are recurring units (R1), as above detailed, the complement to 100% moles being generally recurring units (R1*), as above detailed, and/or recurring units (R2*), as above detailed, and/or recurring units (R3*), as above detailed.

Still more preferably, essentially all the recurring units of the polyarylene (P1) polymer are recurring units (R1), chain defects, or very minor amounts of other units might be present, being understood that these latter do not substantially modify the properties of the polyarylene (P1) polymer.

As will be detailed later on, the polyarylene (P1) polymer may be a polyphenylene copolymer.

For the purpose of the present invention, the term "polyphenylene copolymer" is intended to denote any polymer of which more than 50% by moles of the recurring units are recurring units ($R_{polyphenylene}$), wherein at least 20 moles % of said recurring units ($R_{polyphenylene}$) are arylene $R_{1-b}$ units chosen from a m-phenylene, optionally substituted by at least one monovalent substituting group, as defined above or/and o-phenylene, optionally substituted by at least one monovalent substituting group, as defined above, the remainder being p-phenylene, optionally substituted by at least one monovalent substituting group, as defined above.

Preferably more than 75% by moles, preferably more than 85% by moles, preferably more than 95% by moles, preferably more than 99% by moles of the recurring units of the polyphenylene copolymer are recurring units ($R_{polyphenylene}$), as described above. Most preferably, substantially all the recurring units of the polyphenylene copolymer are recurring units ($R_{polyphenylene}$), as described above, wherein chain defects, or very minor amounts of other units might be present, being understood that these latter do not substantially modify the properties of the polyphenylene copolymer.

In a more preferred embodiment of the present invention, more than 75% by moles, preferably more than 85% by moles, more preferably more than 90% by moles, more preferably more than 99% by moles, even more preferably substantially all the recurring units of the polyphenylene copolymer are a mix of unsubstituted m-phenylene and p-phenylene, substituted by an arylketone group, in particular by the phenylketone group.

When the polyphenylene copolymer comprises, preferably consists essentially of a mix of unsubstituted m-phenylene and p-phenylene, substituted by an arylketone group, in particular by the phenylketone group, as detailed above, then the mole ratio of unsubstituted m-phenylene to p-phenylene, substituted by an arylketone group, in particular by the phenylketone group, is from 70:30 to 30:70, more preferably from 60:40 to 40:60 and most preferably of about 50:50.

Polyphenylene copolymers are commercially available notably from Solvay Specialty Polymers US, L.L.C. as Primospire® PR-250 polyphenylene polymer.

The polyarylene (P1) polymer can be prepared by any method.

The polyarylene (P1) polymer number weight molecular weight is in general from 2000 to 200,000, preferably from 10000 to 140000.

The weight average molecular weight of the polyarylene (P1), is measured by Gel Permeation Chromatography (GPC) using polystyrene calibration standards.

The polyarylene (P1) polymer of the present invention has advantageously a glass transition temperature (Tg) of at least 50° C., preferably at least 120° C., more preferably at least 150° C.

The polyarylene (P1) polymer may have glass transition temperatures (Tg) of 120 to 200° C.

Good results were obtained when the polyarylene (P1) polymer has a glass transition temperature in the range 150 to 180° C.

The glass transition temperature (Tg) may be measured by Differential Scanning calorimetry (DSC) according to ASTM D 3418 Standard.

The polyarylene (P1) polymers have been found particularly suitable for the compositions (C) comprised in the foam material of the present invention in view of their advantageous high strength and high stiffness, which is in turn imparted into the foam material Polyphenylsulfone (PPSU) Polymer As said, the polymer composition (C) comprises at least one (PPSU) polymer.

In a preferred embodiment of the present invention, more than 75% by moles more preferably more than 90% by moles, more preferably more than 99% by moles, even more preferably substantially all the recurring units of the (PPSU) polymer are recurring units ($R_{PPSU}$) of formula (A), chain defects, or very minor amounts of other units might be present, being understood that these latter do not substantially modify the properties.

The (PPSU) polymer may be notably a homopolymer, or a copolymer such as a random or a block copolymer. When the (PPSU) polymer is a copolymer, its recurring units are advantageously a mix of recurring units ($R_{PPSU}$) of formula (A) and of recurring units ($R_{PPSU}*$), different from recurring units ($R_{PPSU}$), such as notably recurring units of formula (D), (E) or (F) represented hereafter:

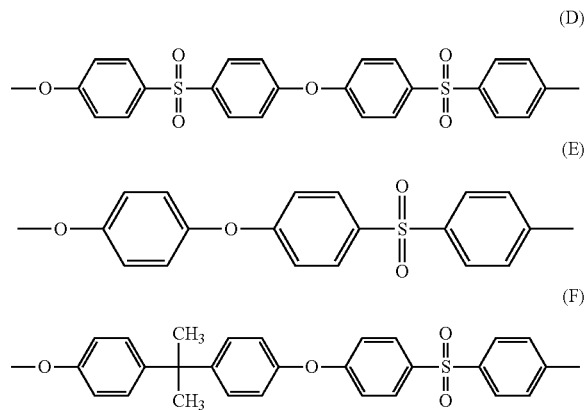

and mixtures thereof.

The (PPSU) polymer can also be a blend of the previously cited homopolymer and copolymer.

RADEL® R PPSU from Solvay Specialty Polymers USA, L.L.C. is an example of a commercially available polyphenylsulfone homopolymer.

(PPSU) polymers can be prepared by known methods.

The (PPSU) polymer weight average molecular weight can be 20,000 to 100,000 grams per mole (g/mol) as determined by gel permeation chromatography using ASTM D5296 with polystyrene standards. In some embodiments the (PPSU) polymer weight average molecular weight can be 40,000 to 80,000 grams per mole (g/mol).

The (PPSU) polymer of the present invention has advantageously a glass transition temperature (Tg) of at least 150° C., preferably at least 180° C., more preferably at least 200° C.

The (PPSU) polymer may have glass transition temperatures (Tg) of 200 to 240° C.

The glass transition temperature (Tg) may be measured by Differential Scanning calorimetry (DSC) according to ASTM D 3418 Standard.

The Applicant has found that the (PPSU) polymer is especially well suited for providing compositions (C) comprised in the foam material of the present invention which are high in glass transition temperatures and easy to fabricate into low density foams having densities less than 120 kg/m³ and as low as 30 kg/m³.

The Composition (C)

The weight of the polyarylene (P1) polymer, based on the total weight of the polyarylene (P1) polymer and the (PPSU) polymer, is advantageously below 70%, preferably below 65%, more preferably below 60%. On the other hand, the weight of the polyarylene (P1) polymer, based on the total weight of the polyarylene (P1) polymer and the (PPSU) polymer, is advantageously above 15%, preferably above 20%.

The weight of the (PPSU) polymer, based on the total weight of the polyarylene (P1) polymer and the (PPSU) polymer, is advantageously below 85%, preferably below 80%. On the other hand, the weight of the (PPSU) polymer, based on the total weight of the polyarylene (P1) polymer and the (PPSU) polymer, is advantageously above 30%, preferably above 35% and more preferably above 40%.

Good results were obtained when the polyarylene (P1) polymer was present in an amount ranging from 20 to 60 wt. %, based on the total weight of the polyarylene (P1) polymer and the (PPSU) polymer.

Excellent results were obtained when the polyarylene (P1) polymer was present in an amount ranging from 25 to 50 wt. %, based on the total weight of the polyarylene (P1) polymer and the (PPSU) polymer.

The total weight of the polyarylene (P1) polymer and the (PPSU) polymer, based on the total weight of the composition (C), is advantageously above 60%, preferably above 80%; more preferably above 90% and more preferably above 95% and more preferably above 99%.

If desired, the composition (C) consists of the polyarylene (P1) polymer and the (PPSU) polymer.

The composition (C) of the present invention may further comprise at least one other thermoplastic polymer (polymer T).

For the purpose of the present invention, the other thermoplastic polymer may notably be any suitable thermoplastic polymer capable of being foamed.

Non limitative examples of polymers (T) suitable for use in composition (C) of the present invention, include for example polysulfones, polyetherimides, polycarbonates and polyarylates.

The weight of said other polymers, based on the total weight of the composition (C), ranges advantageously from 0 to 40%, preferably from 0 to 30%, more preferably from 0 to 20% and even more preferably from 0 to 10%.

The composition (C) can further contain one or more ingredients other than the polyarylene (P1) polymer and the (PPSU) polymer [ingredient (I), herein after].

Non limitative examples of ingredient (I) suitable for use in composition (C) of the present invention, are polymeric compositions, additives such as UV absorbers; stabilizers such as light stabilizers and others; lubricants; plasticizers; pigments; dyes; colorants; anti-static agents; nucleating agents, foaming agents; blowing agents; metal deactivators; and combinations comprising one or more of the foregoing additives. Antioxidants can be compounds such as phosphites, phosphorates, hindered phenols or mixtures thereof. Surfactants may also be added to help nucleate bubbles and stabilize them during the bubble growth phase of the foaming process.

The weight of said ingredient (I), based on the total weight of polymer composition (C), ranges advantageously from 0 to 15%, preferably from 0 to 10% and more preferably from 0 to 5%.

If desired, the composition (C) comprises more than 85 wt. % of the polyarylene (P1) polymer and the (PPSU) polymer with the proviso that the polyarylene (P1) polymer and the (PPSU) polymer are the only polymeric components in the composition (C) and one or more optional ingredient such as notably additives; stabilizers; lubricants; plasticizers; pigments; dyes; colorants; anti-static agents; nucleating agents; foaming agents; blowing agents; metal deactivators; antioxidants and surfactants might be present therein, without these components dramatically affecting relevant mechanical and toughness properties of the composition (C).

The expression 'polymeric components' is to be understood according to its usual meaning, i.e. encompassing compounds characterized by repeated linked units, having typically a molecular weight of 2 000 or more.

As said, the composition (C) has at least two glass transition temperatures (Tg).

The glass transition temperature (Tg) may be measured by Differential Scanning calorimetry (DSC) according to ASTM D 3418 Standard.

In one embodiment of the present invention, the composition (C) has two glass transition temperatures Tg1 and Tg2 wherein the difference in absolute value γ between Tg1 and Tg2 is at least 10° C., preferably at least 20° C., more preferably at least 30° C.

The composition (C) can be prepared by a variety of methods involving intimate admixing of the polymer materials with any optional ingredient (I), as detailed above, desired in the formulation, for example by melt mixing or a combination of dry blending and melt mixing. Typically, the dry blending of the polyarylene (P1) polymer and the (PPSU) polymer and all other optional thermoplastic polymers (polymers T) and optional ingredient (I), as above detailed, is carried out by using high intensity mixers, such as notably Henschel-type mixers and ribbon mixers.

So obtained powder mixture can comprise the polyarylene (P1) polymer, the (PPSU) polymer and all other optional thermoplastic polymers (polymers T) and optional ingredient (I), as above detailed, in the weight ratios as above detailed, suitable for obtaining effective foaming, or can be a concentrated mixture to be used as masterbatch and diluted in further amounts of the polyarylene (P1) polymer, the (PPSU) polymer and all other optional thermoplastic polymers (polymers T) and optional ingredient (I), as above detailed, in subsequent processing steps.

It is also possible to manufacture the composition of the invention by further melt compounding the powder mixture as above described. As said, melt compounding can be effected on the powder mixture as above detailed, or preferably directly on the polyarylene (P1) polymer, the (PPSU) polymer and all other optional thermoplastic polymers (polymers T) and optional ingredient (I), as detailed above. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

Specially designed extruders, i.e. extruders specifically designed to effectively control temperature such that further processes such as foaming is not prematurely initiated and such that the composition may be melted, blended, extruded and palletized without premature foaming of the composition, are particularly preferred. The design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients, but still mild enough to advantageously keep the processing temperature of the composition below that in which foaming may be prematurely initiated, in case optional chemical foaming ingredients are comprised in the composition. Provided that the processing temperature is kept well above the softening point of the polyarylene (P1) polymer, the (PPSU) polymer and all other optional thermoplastic polymers (polymers T) and optional ingredient (I) and, when chemical foaming agent(s) are comprised, below the decomposition temperature of any of said chemical foaming components possibly present, it is advantageously possible to obtain strand extrudates of the composition (C) of the invention which have not undergone significant foaming. Such strand extrudates can be chopped by means e.g. of a rotating cutting knife aligned downwards the die plate, generally with an underwater device, which assures perfect cutting knife to die plate alignment, and collected under the form of pellets or beads. Thus, for example composition (C) which may be present in the form of pellets or beads can then be further used for the manufacture of the foam material.

The Foam Material

As said, the foam material of the present invention, is made from the composition (C), as described above, by an extrusion foaming process.

The Applicant has surprisingly found that extrusion foaming of the composition (C), as mentioned above, is effective in providing foam materials having one glass transition temperature (Tg).

The foam material of the present invention has advantageously a glass transition temperature (Tg) of at least 150° C., preferably at least 160° C., more preferably at least 175.

The foam material of the present invention has in general a glass transition temperatures (Tg) of 175 to 215° C., in other words said glass transition temperature (Tg) is intermediate to the Tg's of the two polymer components of the composition (C), as described above, confirming the miscibility between the two polymers in the foamed state.

It has been found that the foam materials of the present invention having one glass transition temperature (Tg) are endowed by having superior mechanical properties such as high stiffness and strength properties at a low foam density, improved thermal performance capabilities, in particular more robust resistance to very high temperatures used in the manufacturing of structural foamed articles and having improved chemical resistance, improved structural integrity, high void content; low apparent density; closed cell structures and substantially uniform cell sizes.

For the purpose of the present invention, the term "substantially uniform cell size" is intended to denote a foam material wherein the magnitude of one standard deviation of the cell size frequency distribution is at most 40% of the value of the estimated mean cell size, so as an example, a foam with an estimated mean cell size of 100 micrometers and a standard deviation of 35 micrometers in cell size distribution would fall within the scope of the above definition for "substantially uniform cell size".

It has been found that the foam materials of the present invention, endowed by having uniform cell size, have improved mechanical properties since larger cells act as a weak points in the foam, which may initiate a failure.

The extrusion foaming process is in general a continuous process. In general, in an extrusion foaming process, the foam is formed by melting a thermoplastic, or a mixture comprising a thermoplastic (e.g. the composition (C) and a nucleating agent in the form of a pellet or a bead), giving a melt, whereby said melt is mixed with at least one blowing agent under pressure. At the exit of the extruder, during depressurization, the blowing agent vaporizes and, by absorbing heat of evaporation, rapidly cools the melt thereby forming the foam.

Any suitable extrusion equipment capable of processing composition (C) of the present invention can be used for the extrusion foaming. For example, single or multiple-screw extruders can be used, with a tandem extruder being preferred.

In a specific preferred embodiment, a mixture comprising the composition (C) and any nucleating agent are first melt blended together in a primary extruder. The blowing agent is then fed into the primary extruder and mixed into the melt blend under high pressure and temperature in the last sections of the primary extruder. The melt is then fed under pressure to a secondary extruder, which is used to cool the material to be foamed and transport it through a die to a calibrator to form the foam material. The calibrator helps to control the cooling rate of the foaming mixture. Therefore, it is beneficial in helping to control the thickness, width and density of the foam material. The die is operated at a specific temperature range and pressure range to provide the necessary melt strength and to suppress premature foaming in the die. In one embodiment, a single screw extruder is used for both the primary extruder and the secondary extruder. In an alternative embodiment, a twin-screw extruder is used for both the primary extruder and the secondary extruder. In yet another alternative embodiment, a single screw extruder is used for one of the primary extruder or the secondary extruder and a twin-screw extruder is used for the other. In a preferred embodiment, a twin-screw extruder is used for the primary extruder and a single screw extruder is used for the secondary extruder.

In the extrusion foaming process of the invention, a blowing agent, or blends of blowing agents, can advantageously be used in different amounts depending on the desired density of the foam. In one preferred embodiment of the present invention, the amount used of the blowing agent is from 2 to 15 percent by weight, preferably from 3 to 14 percent by weight, particularly preferably from 5 to 12 percent by weight, based in each case on the total weight of the composition (C).

In general, a larger amount of blowing agent may be used for embodiments where lower density foams are to be formed.

In general, the blowing agent is selected to be sufficiently soluble to grow the voids into the bubbles that form a foam material having the selected density. As a result, if all of the parameters including solubility of the blowing agent with the polyarylene (P1) polymer, the (PPSU) polymer and all other optional thermoplastic polymers (polymers T) (at pressure, temperature and shear rate) are balanced and the walls of the bubbles are sufficiently stable such that they do not rupture or coalesce until the viscosity/melt strength of the resin/blowing agent is strong enough to form a stable foam as it cools, the result is a good, uniform, small celled foam having a selected density.

In general, the type of foam to be produced may also vary depending on other factors such as the presence of nucleating agent particles, the loading and/or process conditions, and the type of equipment used to form the foam materials.

In the extrusion foaming process of the invention, a nucleating agent, or blends of nucleating agents, can advantageously be used and is/are preferably used in addition to the blowing agent, or blends of blowing agents. In general, the nucleating agent helps control the foam structure by providing a site for bubble formation, and the greater the number of sites, the greater the number of bubbles formed per unit volume in the absence of a nucleating agent, random non-uniform and large sized are expected whereas for high nucleating agent concentrations a very uniform fine cell structure is expected but at the expense of a higher density. An optimum concentration of nucleating agent is needed to achieve the desired balance of density and fine cell sizes along with cell uniformity.

Suitable nucleating agent that may be used in the present invention include, but are not limited to, metallic oxides such as titanium dioxide ($TiO_2$), clays, talc, silicates, silica, aluminates, barites, titanates, borates, nitrides, notably boron nitride, and even some finely divided, unreactive metals, carbon-based materials (such as diamonds, carbon black, nanotubes and graphenes) or combinations including at least one of the foregoing agents, preferably titanium dioxide and talc are used as suitable nucleating agents in the formation of the foam material of the present invention.

In alternative embodiments, silicon and any crosslinked organic material that is rigid and insoluble at the processing temperature may also function as nucleating agents.

In alternative embodiments, other fillers may be used provided they have the same effect as a nucleating agent in terms of providing a site for bubble formation. This includes fibrous fillers such as aramid fibers, carbon fibers, glass fibers, mineral fibers, or combinations including at least one of the foregoing fibers. Some nano-fillers and nano-reinforcements can also be used as nucleating agents. These include such materials as nano-silicates, nano-clays, carbon nanofibers and carbon nanotubes as well as graphenes and multi-layered graphitic nano-platelets.

In a preferred embodiment, the nucleating agent is preferably used in the following amounts: advantageously from 0.1 to 5% by weight, preferably from 0.2 to 3% by weight based in each case on the total weight of the composition (C).

Good results were obtained when the nucleating agent were titanium dioxide or talc and used in an amount from 0.5 to 2% by weight based on the total weight of the composition (C).

Having regards to the nature of the blowing agent, the foaming process may be a chemical or a physical foaming process.

In one preferred embodiment, the extrusion foaming process is a physical foaming process.

In a physical foaming process, use is made of physical foaming ingredients, such as physical blowing agents and optionally nucleating agents.

Physical foaming agents generally refer to those compounds that are in the gaseous state at the foaming temperature.

The physical foaming agents can be fed to the equipment, wherein foaming takes place, either in their gaseous form, or in any other form, from which a gas will be generated via a physical process (e.g. evaporation, desorption). These may or may not be in a liquid state at ambient conditions. In a preferred embodiment, the physical blowing agent is in a liquid state at room temperature and ambient pressure. Otherwise, physical foaming may be included in the preformed composition (C), to be introduced in the foaming equipment.

In the foaming extrusion process of the present invention, any conventional physical blowing agent can be used such as inert gases, e.g. $CO_2$, nitrogen, argon; hydrocarbons, such as propane, butane, pentane, hexane; aliphatic alcohols, such as methanol, ethanol, propanol, isopropanol, butanol; aliphatic ketones, such as acetone, methyl ethyl ketone; aliphatic esters, such as methyl and ethyl acetate; fluorinated hydrocarbons, such as 1,1,1,2-tetrafluoroethane (HFC 134a) and difluoroethane (HFC 152a); and mixtures thereof. Preferably, isopropanol or ethanol are used as physical blowing agent.

It is understood that as the physical blowing agent is supplied in fluid form to a melt, it advantageously generates bubbles. This may also be realized in extrusion devices.

In an alternative embodiment of the present invention, the extrusion foaming process is a chemical foaming process.

In a chemical foaming process, use is generally made of a chemical foaming agent, in particular a chemical blowing agent.

Chemical foaming agents generally refer to those compositions which decompose or react under the influence of heat in foaming conditions, to generate a foaming gas.

Chemical foaming agents can be added to a melt thereby generating in situ the foaming gas or alternatively the generated foaming gas can be added to the melt. This may also be realized in extrusion devices.

Suitable chemical foaming agents include notably simple salts such as ammonium or sodium bicarbonate, nitrogen evolving foaming agents; notably aromatic, aliphatic-aromatic and aliphatic azo and diazo compounds, such as azodicarbonamide and sulphonhydrazides, such as benzene sulphonhydrazide and oxy-bis(benzenesulphonhydrazide). Said chemical foaming agents can optionally be mixed with suitable activators, such as for example amines and amides, urea, sulphonhydrazides (which may also act as secondary foaming agent); and the like.

While the finished foam material is substantially free of the blowing agents, it is contemplated that residual amounts of the one or more blowing agents may remain in the foam material, although these residual amounts are not sufficient to adversely affect the foam characteristics of the foam material.

In alternative embodiments, any of the residual blowing agent may be reduced by exposing the foam material further to a heat cycle.

The foam material of the present invention has advantageously a density in the range from 10 to 500 $kg/m^3$, preferably from 20 to 400 $kg/m^3$, more preferably from 20 to 300 $kg/m^3$, even more preferably from 25 to 250 $kg/m^3$, most preferably from 25 to 100 $kg/m^3$.

The foam material of the present invention has advantageously an average cell size of less than 1000 μm, preferably less than 500 μm, more preferably less than 250 μm, even more preferably less than 180 μm and most preferably less than 130 μm.

The density can be measured according to ASTM D792.

The cell size can be measured using optical or scanning electron microscopy.

The foam materials, as formed according to the present invention may be in a variety of shapes, such as foam boards, foam sheets, foam film, foam tubes or any shape possible as determined by the skilled in the art using standard techniques and routine work, temperature, power and residence time of the composition in the extruder so as to obtain final desired shaped foamed parts having the desired void fraction or foaming level.

An aspect of the present invention also provides an article comprising at least one component comprising the foam material, detailed as above, which provides various advantages over prior art parts and articles, in particular higher stiffness and improved strength properties relative to state of the art foams at a given density at elevated temperatures, particularly at temperatures between 150° C. and 230° C.; the increased strength and stiffness at elevated temperature will result in improved structural integrity of the foam overall especially when high temperature fabrication steps such as for example thermosetting resin transfer molding, are applied.

Preferably, the article or part of the article consists of the foam material as above detailed.

In a particular embodiment, the article is an aircraft structural component a structural or secondary aircraft component.

In another specific embodiment, the aircraft structural component is a sandwich panel comprised of a core comprising the foam material of the present invention and laminated skin layers comprised of a continuous fiber-reinforced thermoset or thermoplastic composite.

Said sandwich panels can be prepared by known methods, such as for example by vacuum infusion which involves notably infusing a system comprised of a foam with a skin comprising of carbon fibers or other fibers as mentioned above with an epoxy resin by means of an applied vacuum. The impregnation is generally performed at low temperatures which are usually in the range from 80° C. to 130° C. and the curing is generally between 120° C. and 200° C.

The use of the foam materials of the present invention as part of an aircraft structural component as described above are also objects of the present invention.

It is known in the art that epoxy resin systems such as Hexflow VRM34, (a two-part, amine-cured epoxy system) are used in vacuum assisted resin transfer molding (VARTM) processes, used in the manufacturing of aircraft structural components such as wing and fuselage structural elements.

Should the disclosure of any patents, patent applications, and publications which are incorporated herein by reference conflict with the description of the present application to the extent that it may render a term unclear, the present description shall take precedence.

EXAMPLES

The invention will now be described in more details with reference to the following examples, whose purpose is merely illustrative and not intended to limit the scope of the invention.

Raw Materials

Titanium Dioxide: —Tipure® R-105 titanium dioxide, a rutile $TiO_2$ manufactured by the chloride process, treated with silica and alumina.

RADEL® R PPSU from Solvay Specialty Polymers USA, L.L.C.

Primospire® PR-250 polyphenylene polymer from Solvay Specialty Polymers USA, L.L.C.

®Irganox 1010 from BASF Corp.

Mistron® Vapor talc from Lintech International

General Procedure for the Preparation of the Foam Material (P)

A polymer or polymer mixture was compounded with Tipure® R-105 $TiO_2$ or Mistron® Vapor talc and optionally ° Irganox 1010. Compounding into pellets was performed on a Berstorff 25 mm twin screw extruder having an L/D ratio of 40:1 and eight barrel sections, of which sections 2-8 are equipped with heating and cooling. The physical mixture was then gravimetrically fed into the first barrel section of a 25 mm Berstorff co-rotating intermeshing twin-screw extruder having an L/D ratio of 40 and eight barrel sections. Barrel temperature settings for barrel sections 2 through 8 were set according to the appropriate temperatures (see details below) respectively and no heat was applied to barrel section 1 where the extruder feed throat is located. The die temperature setting was at 330° C. or 340° C. Appropriate extruder screw speed was used (see details below) and vacuum venting was applied at barrel section 7 to remove any residual volatile compounds that may be present. The extrudate from each blend formulation was stranded into a water bath where the strands were cooled and then diced into pellets using a pelletizer. The pellets produced from each formulation were packed in a dry state after compounding in either hermetically sealed polyethylene pails or in aluminum lined moisture barrier bags to maintain dryness prior to foaming. Pellets from each formulation were next fed to the foaming set up which consisted of a tandem extrusion line from Reifenhäuser that consisted of two extruders, the first being a twin-screw extruder (i.e. extruder "A") with an L/D of 43 and a screw diameter of 41 mm to plasticate the polymers and inject the blowing agent, and the second being a single-screw extruder (i.e. extruder "B") to cool down the polymer/blowing agent mixture and pump it through a slit die to produce the foam. The second or cooling extruder had an L/D of 30 and a screw diameter of 50 mm. A slit die with a width of 30 mm and a height of 1.5 mm was used at the exit of extruder "B". Isopropanol or ethanol was used as blowing agent and its concentration was set at the appropriate value (see in Tables 1 and 2, expressed in wt %). The blowing agent was metered into the extruder "A" using three high pressure liquid chromatography (HPLC) pumps whose feed lines were merged in a T-configuration. The combined throughput of blowing agent from the three pumps amounted to the desired amount feed rate relative to the total throughput of resin formulation and blowing agent. The metering point of the blowing agent on the extruder "A" was approximately two-thirds of the way down the length of the barrel from the extruder's feed throat. A mixing section in the latter portion of the extruder "A" assured good homogenization between the polymer formulation and the blowing agent. There were 9 barrel sections in extruder "A" and the barrel section temperatures were set as follows: 140° C. for section 1, 330° C. for section 2, 340-360° C. for sections 3 through 5 and 330° C. for sections 6 through 9. Temperature settings in the three heated zones of the extruder "A" were 360° C. for all three zones. The temperature settings in the extruder "B" were much lower and went progressively down from 250° C. at the inlet section to the range 150-200° C. in the zone just before the die. The extruder "B" temperature settings were controlled by electric heaters coupled with solenoid-controlled water lines that circulated water in the individually controlled barrel sections for cooling. The foam material was extruded out of the die.

The pellets made from the polymer or polymer mixture were further analyzed by DSC to determine their glass transition temperature (Tg) (results are summarized in Table 1).

The foams obtained were further analyzed by DSC to determine their glass transition temperature (Tg), and characterized for density and cell size distribution (results are summarized in Table 1).

The Following Characterizations Carried Out on the Materials of the Examples are Indicated Hereinafter:

Glass Transition Temperature (Tg) Measurements

The glass transition temperature (Tg) of the pellets made from the polymer or polymer mixture, as described above, and foams obtained, as described above, was measured by Differential Scanning calorimetry (DSC) according to ASTM D 3418 Standard.

Density Measurements

Density was measured using two techniques. For uncalibrated foam samples (examples C1, 2-4 and C5), which did not have a precise geometry, the buoyancy technique was used by weighing the foam specimens in air and in water following the procedure of ASTM method D792. For calibrated foam samples, on the other hand, ASTM method D1622 was employed where the density was measured as the ratio of the weight to volume of foam blocks having precise dimensions.

Cell Size Measurements

Cell size and cell size distribution in the foams obtained were characterized by scanning electron microscopy (SEM). Image analysis of the SEM images of foam cross sections was performed using the "ImageJ" image analysis software Version 1.44 which is publically available on the Internet.

Mechanical Properties

The mechanical properties of the foams obtained were tested for Compressive Strength according to ASTM D1621 standard method. The foam panels produced were first sanded on the top and bottom surfaces to remove the irregular skin on either side of the foam material and to level and smooth out the top and bottom surfaces of the panel. 2 inch×2 inch square sections were then machined using a precision band saw to produce specimens of well defined dimensions for compression testing. Prior to compression testing the compression test specimens were heat treated in a forced air convection oven at a temperature of 225° F. (107° C.) for 24 hours to assure removal of any residual blowing agent from the foam specimens.

It is known that the Compressive Strength of a foam material is strongly dependent on its foam density. Therefore, all Compressive Strength data measured for the foam materials, were normalized to Compressive Strength values at a density of 60 kg/m³, and at a density of 100 kg/m³, respectively by using the following equations $S_{60}=S(60/\rho)^{1.5}$ and $S_{100}=S(100/\rho)^{1.5}$, where $S_{60}$ is the compressive strength normalized to a density of 60 kg/m³ and $S_{100}$ is the compressive strength normalized to a density of 100 kg/m³; S and ρ are the compressive strength and density of the sample, respectively.

Examples C1, 2-4 and C5

The foamed material of examples C1, 2-4 and C5 were prepared according to the general procedure as described above. First the foaming compound was produced by feeding the physical mixture of the polymers and $TiO_2$ (2 wt % relative to total weight of composition (C)) into the first barrel section of a 25 mm Berstorff co-rotating intermeshing twin-screw extruder at a rate of 22 lb/hr (10 kg/hr). Barrel temperature settings for barrel sections 2 through 8 were set at: 260, 290, 300, 300, 320, 340 and 340° C., respectively and no heat was applied to barrel section 1 where the extruder feed throat is located. The die temperature setting was 330° C. The extruder screw speed used was 130-140 RPM. The foaming process used was the same one described above under the heading "General procedure for the preparation of the foam material (P)". In the foaming process, Isopropanol was used as blowing agent and its concentration was set at 8 wt %. The foam was extruded out of the die and collected as a sheet without calibration at the exit of the die. The corresponding properties are shown in Table 1.

Comparative Example 6 (C6)

This comparative example C6 was prepared according to a batch foaming process, i.e. a supercritical foaming process. A molded plaque having 1 cm×1 cm×0.25 cm in dimensions was prepared according to the procedure as described in Example 9 of WO 2006/094988, which is incorporated herein by reference in its entirety, from a blend of 50 wt. % of RADEL® R 5100 PPSU and 50 wt. % of PrimoSpire® PR-250 Polyphenylene, Self-Reinforced (SRP). Said molded plaque was introduced into a stainless steel pressure vessel and the vessel was charged with $CO_2$ at a pressure of 45 bar. The pressure vessel was heated to a temperature of 130° C. and the polymer sample was maintained at this pressure and temperature for 24 hours. Following this treatment, the vessel was depressurized and the sample was removed and immediately placed into a mineral oil bath controlled at a temperature of 240° C. for 30 seconds to allow it to expand. After that, the foamed sample was taken out of oil bath and immediately immersed into a water bath at room temperature to prevent the foam from collapsing. The so obtained foam block was measured for its density and was found to have a density of 656 kg/m³. The corresponding properties are shown in Table 1.

Examples C7, 8-10 and C11

The foamed material of examples C7, 8-10 and C11 were prepared according to the general procedure as described above. First the foaming compound was prepared by feeding the physical mixture of the polymers, Mistron® Vapor talc (amount see in Table 2 below) and ° Irganox 1010 (0.125 wt. % relative to total weight of composition (C)) gravimetrically into the first barrel section of a 25 mm Berstorff co-rotating intermeshing twin-screw extruder at a rate of 25 lb/hr (11.4 kg/hr). Barrel temperature settings for barrel sections 2 through 8 were set at 300° C. and no heat was applied to barrel section 1 where the extruder feed throat is located. The die temperature setting was 340° C. The extruder screw speed used was 200 RPM. The foaming process used was the same one described above under the heading "General procedure for the preparation of the foam material (P)". In the foaming process, ethanol was used as blowing agent and its concentration was set at the desired weight % as shown in Table 2, below. Temperature settings in the "A" and "B" extruders and other set up conditions were as described in the general procedures. One notable difference for these examples relative to the preceding ones was the use of a heated calibrator in these examples to provide better control over foam thickness uniformity. The foam was extruded out of the die and was conformed to a uniform thickness ranging from 5 to 30 mm using the heated calibrator to produce panels of a uniform thickness and width.

The foams obtained are further analyzed by DSC to determine their glass transition temperature (Tg) and show a single Tg as measured by DSC for the foam materials of examples 8-10 which is intermediate to the Tg's of the two polymer components of the blend confirming the miscibility between the two polymers in the foamed state. The corresponding foam material properties are shown in Table 2.

TABLE 1

| Examples N° | C1 | 2 | 3 | 4 | C5 | C6 |
|---|---|---|---|---|---|---|
| RADEL ® R 5100 PPSU (wt. % relative to total weight of PPSU and (SRP)) | | 40 | 50 | 75 | 100 | 50 |
| PrimoSpire ® PR-250 Polyphenylene, Self-Reinforced (SRP) (wt. % relative to total weight of PPSU and (SRP)) | 100 | 60 | 50 | 25 | | 50 |
| $TiO_2$ (wt. % relative to total weight of composition (C)) | 2 | 2 | 2 | 2 | 2 | |
| Polymer composition (C) properties | | | | | | |
| Tg1 (° C.) | | 219.4 | 212.7 | 216.4 | 222.4 | 215.5 |
| Tg2 (° C.) | 167.2 | 182.1 | 176.7 | 178.6 | | 177.7 |
| Foam material properties | | | | | | |
| Tg (° C.)$^{(a)}$ | 172.3 | 181.9 | 190.6 | 210.8 | 221.8 | Tg1' 215.1 Tg2' 178.9 |
| Density (kg/m³) | 46.5 | 35 | 42 | 50 | 46.5 | 656 |
| Average Cell Size (μm) | 204 | 118 | 74 | 108 | 71 | |

$^{(a)}$A single Tg as measured by DSC for the foam materials of examples 2-6 is intermediate to the Tg's of the two polymer components of the blend confirming the miscibility between the two polymers in the foamed state while two Tg's as measured for the foam material of the comparative example C8 means the presence of two phases and that the two polymers are not miscible in the foamed state when a batch foaming process was used (D. R. Paul and S. Newman, Polymer Blends, Academic Press, New York, 1978, Volume 1, Chapter 5, pp. 188-189).

TABLE 2

| | Examples N° | | | | |
|---|---|---|---|---|---|
| | C7 | 8 | 9 | 10 | C11 |
| RADEL ® R 5100 PPSU (wt. % relative to total weight of PPSU and (SRP)) | | 33 | 60 | 75 | 100 |
| PrimoSpire ® PR-250 Polyphenylene, Self-Reinforced (SRP) (wt. % relative to total weight of PPSU and (SRP)) | 100 | 67 | 40 | 25 | |
| Mistron ® Vapor talc (wt. % relative to total weight of composition (C)) | 0.75 | 0.5 | 0.5 | 1.5 | 0.75 |
| Ethanol (wt. % relative to total weight of composition (C)) | 9.5 | 9.7 | 9.7 | 10.0 | 9.0 |

TABLE 2-continued

|  | Examples N° | | | | |
| --- | --- | --- | --- | --- | --- |
|  | C7 | 8 | 9 | 10 | C11 |
| Properties of the foam material | | | | | |
| Density (kg/m$^3$) | 69.2 | 91.9 | 98.7 | 76.4 | 106.4 |
| Average Cell Size (μm) | 141 | 110 | 162 | 100 | 190 |
| Mechanical properties | | | | | |
| Compressive Strength (psi) | 93.7 | 185.6 | 231.3 | 188.6 | 129.7 |
| Normalized Comp. Str. at 60 kg/m$^3$ Density (psi)$^{(a)}$ | 75.7 | 97.9 | 103.5 | 131.0 | 55 |
| Normalized Comp. Str. at 100 kg/m$^3$ Density (psi)$^{(b)}$ | 162.9 | 210.6 | 235.9 | 291.4 | 118.3 |
| Theoretically expected compressive Strength (psi) of foamed blends for 60 kg/m$^3$ density based on weighted average$^{(c)}$ | 110 | 91.9 | 77 | 68.9 | 55 |
| Theoretically expected compressive Strength (psi) of foamed blends for 100 kg/m$^3$ density based on weighted average$^{(c)}$ | 236.6 | 197.6 | 165.6 | 147.9 | 118.3 |

$^{(a)}$Compressive Strength normalized to Compressive Strength at a density of 60 kg/m$^3$ using equation $S_{60} = S(60/\rho)^{1.5}$ where $S_{60}$ is the compressive strength normalized to a density of 60 kg/m$^3$ and S and ρ are the compressive strength and density of the foam material.
$^{(b)}$Compressive Strength normalized to Compressive Strength at a density of 100 kg/m$^3$ using equation $S_{60} = S(100/\rho)^{1.5}$ where $S_{100}$ is the compressive strength normalized to a density of 100 kg/m$^3$ and S and ρ are the compressive strength and density of the foam material.
$^{(c)}$Theoretically computed compressive strength relies on the relative compressive strengths of the pure bulk PR-250 and PPSU polymers which have been measured by us as 26400 psi and 13200 psi, respectively, and calculates a weighted average compressive strength for the blends accordingly.

The invention claimed is:

1. A foam material having one glass transition temperature (Tg), as measured by differential scanning calorimetry (DSC), and made by an extrusion process from an immiscible composition (C) having at least two glass transition temperatures (Tg), wherein said composition (C) comprises:
   (i) from above 10 wt. % to below 75 wt. % of at least one polyarylene (P1) polymer, wherein more than 50% by moles (moles %) of the recurring units of said polyarylene (P1) polymer are recurring units (R1) consisting of an arylene group, wherein said arylene group is a hydrocarbon divalent group consisting of one core (C) composed of one benzene ring or of a plurality of benzene rings fused together by sharing two or more neighboring ring carbon atoms, said benzene ring being optionally substituted, wherein each of said arylene group is bound to two other arylene groups of neighboring recurring units (R1) through a first C—C bond (E1) and a second C—C bond (E2), wherein at least 20 moles % of recurring units (R1) are kink-forming arylene units (R1-b), arylene$_{R1-b}$ units, the remainder being rigid rod-forming arylene units (R1-a), arylene$_{R1-a}$ units, different from the arylene$_{R1-b}$ units, wherein in said arylene$_{R1-a}$ units the bond (E1) and the bond (E2) are co-linear and anti-parallel towards each other; and
   (ii) from above 25 wt. % to below 90 wt. % of at least one polyphenylsulfone polymer, (PPSU) polymer, wherein more than 50% by moles of the recurring units of said (PPSU) polymer are recurring units (R$_{PPSU}$) of formula (A):

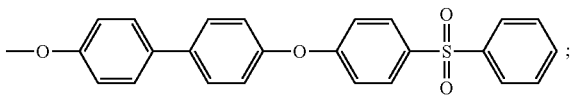
(A)

wherein the weight percentages are based on a total wt. % of the polyarylene (P1) polymer and the (PPSU) polymer, and the foam material has a density of 10 kg/m$^3$ to 50 kg/m$^3$ according to ASTM D792.

2. The foam material according to claim 1, wherein the mole amount of the arylene$_{R1-b}$ units in the polyarylene (P1) polymer is in an amount from 45-55%, based on a total amount of moles of the recurring units (R1).

3. The foam material according to claim 1, wherein the arylene$_{R1-a}$ units are p-phenylenes substituted by at least one monovalent substituting group chosen from arylketones and aryloxyarylketones, said arylketones and aryloxyarylketones being unsubstituted, or substituted by at least one monovalent substituting group.

4. The foam material according to claim 1, wherein the arylene$_{R1-b1}$ units are m-phenylenes optionally substituted by at least one monovalent substituting group.

5. The foam material according to claim 1 wherein the polyarylene (P1) polymer is a polyphenylene copolymer wherein more than 50% by moles of the recurring units are recurring units, (R$_{Polyphenylene}$), wherein at least 20 moles % of said recurring units (R$_{Polyphenylene}$) are arylene R$_{1-b}$ units chosen from a m-phenylene, optionally substituted by at least one monovalent substituting group, or/and o-phenylene, optionally substituted by at least one monovalent substituting group, the remainder being p-phenylene, optionally substituted by at least one monovalent substituting group.

6. The foam material according to claim 1, wherein the polyarylene (P1) polymer is present in an amount ranging from 25 to 50 wt. %, based on a total weight of the polyarylene (P1) polymer and the (PPSU) polymer.

7. The foam material according to claim 1, wherein the glass transition temperature (Tg) of said foam material is of at least 150° C.

8. The foam material according to claim 1, wherein the foam material has a substantially uniform cell size.

9. The foam material according to claim 1, wherein a blowing agent is used in the extrusion process in an amount from 2 to 15% by weight based on a total weight of the composition (C).

10. The process according to claim 1, wherein a nucleating agent is used in the extrusion process in an amount from 0.1 to 5.0% by weight based on a total weight of the composition (C).

11. The process according to claim 10, wherein the nucleating agent is titanium dioxide or talc.

12. An article comprising at least one component comprising the foam material according to claim 1.

13. The article of claim 12 wherein said article is a structural aircraft component or secondary aircraft component.

14. The article of claim 13 wherein said structural aircraft component is a sandwich panel comprising:
(i) a core comprising a foam material having one glass transition temperature (Tg), as measured by differential scanning calorimetry (DSC), and made by an extrusion process from an immiscible composition (C) having at least two glass transition temperatures (Tg), wherein said composition (C) comprises:
(i) from above 10 wt. % to below 75 wt. % of at least one polyarylene (P1) polymer, wherein more than 50% by moles (moles %) of the recurring units of said polyarylene (P1) polymer are recurring units (R1) consisting of an arylene group, wherein said arylene group is a hydrocarbon divalent group consisting of one core (C), composed of one benzene ring or of a plurality of benzene rings fused together by sharing two or more neighboring ring carbon atoms, said benzene ring being optionally substituted, wherein each of said arylene group is bound to two other arylene groups of neighboring recurring units (R1) through a first C—C bond (E1) and a second C—C bond (E2), wherein at least 20 moles % of recurring units (R1) are kink-forming arylene units (R1-b), arylene$_{R1-b}$ units, the remainder being rigid rod-forming arylene units (R1-a), arylene$_{R1-a}$ units, different from the arylene$_{R1-b}$ units, wherein in said arylene$_{R1-a}$ units the bond (E1) and the bond (E2) are co-linear and anti-parallel towards each other; and
(ii) from above 25 wt. % to below 90 wt. % of at least one polyphenylsulfone polymer, (PPSU) polymer, wherein more than 50% by moles of the recurring units of said (PPSU) polymer are recurring units (R$_{PPSU}$) of formula (A):

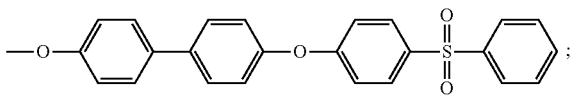
(A)

wherein the weight percentages are based on a total wt. % of the polyarylene (P1) polymer and the (PPSU) polymer; and
(ii) laminated skin layers comprised of a continuous fiber-reinforced thermoset or thermoplastic composite.

15. The foam material according to claim 9, wherein the blowing agent is isopropanol or ethanol.

16. The foam material according to claim 1, wherein the extrusion process is a continuous process.

* * * * *